US011743234B2

(12) United States Patent
Raghuraman et al.

(10) Patent No.: US 11,743,234 B2
(45) Date of Patent: Aug. 29, 2023

(54) UPGRADING FIREWALL MODULE ON PORT-BY-PORT BASIS

(71) Applicant: VMware, Inc., Palo Alto, CA (US)

(72) Inventors: Vignesh Raghuraman, San Francisco, CA (US); Guolin Yang, San Jose, CA (US); Boon S. Ang, Saratoga, CA (US); Prerit Rodney, Union City, CA (US); Rajeev Nair, Newark, CA (US); Ashwin Mahesh Shroff, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 256 days.

(21) Appl. No.: 17/223,956

(22) Filed: Apr. 6, 2021

(65) Prior Publication Data

US 2022/0321536 A1 Oct. 6, 2022

(51) Int. Cl.
*H04L 9/40* (2022.01)
*H04L 12/46* (2006.01)

(52) U.S. Cl.
CPC ...... *H04L 63/0263* (2013.01); *H04L 12/4633* (2013.01); *H04L 63/0236* (2013.01); *H04L 63/20* (2013.01)

(58) Field of Classification Search
CPC ............. H04L 63/0263; H04L 12/4633; H04L 63/0236; H04L 63/20; H04L 41/082
See application file for complete search history.

(56) References Cited

U.S. PATENT DOCUMENTS

| | | | |
|---|---|---|---|
| 8,782,632 B1 * | 7/2014 | Chigurapati | H04L 41/082 717/172 |
| 8,943,489 B1 * | 1/2015 | Qu | G06F 8/656 717/172 |
| 10,200,279 B1 | 2/2019 | Aljaedi | |
| 10,534,601 B1 * | 1/2020 | Venkata | G06F 8/65 |
| 11,057,292 B1 | 7/2021 | Jain et al. | |
| 11,108,629 B1 | 8/2021 | Cahyadi et al. | |
| 11,245,669 B1 * | 2/2022 | Ramanna | H04L 63/0263 |
| 2016/0055019 A1 | 2/2016 | Thakkar et al. | |
| 2016/0205071 A1 * | 7/2016 | Cooper | H04L 63/0209 726/1 |

(Continued)

OTHER PUBLICATIONS

Non-Published Commonly Owned Related U.S. Appl. No. 17/223,959 with similar specification, filed Apr. 6, 2021, 37 pages, VMware, Inc.

*Primary Examiner* — Cheng-Feng Huang
(74) *Attorney, Agent, or Firm* — ADELI LLP

(57) ABSTRACT

Some embodiments of the invention provide a method of upgrading a firewall module executing on a host computer to process traffic sent to and from machines executing on the host computer. While a first version of the firewall module executes on the host computer to process the traffic to and from the machines, the method loads a second version of the firewall module alongside the first version of the firewall module. For each of multiple ports associated with machines executing on the host computer for which the firewall module processes traffic sent to and from the port, the method saves a runtime state of the first version that relates to the port, transfers association of a firewall filter associated with the port from the first version to the second version, and restores the saved runtime state for the port to the second version.

18 Claims, 12 Drawing Sheets

(56) References Cited

U.S. PATENT DOCUMENTS

| | | | |
|---|---|---|---|
| 2017/0214719 A1* | 7/2017 | Mohan | H04L 63/205 |
| 2017/0318098 A1 | 11/2017 | Sanghvi et al. | |
| 2017/0353494 A1* | 12/2017 | Krinos | H04L 63/10 |
| 2018/0034847 A1 | 2/2018 | Stella | |
| 2018/0330420 A1 | 11/2018 | Staats | |
| 2019/0036781 A1* | 1/2019 | Prabhu | H04L 41/12 |
| 2019/0227781 A1* | 7/2019 | Ramasamy | H04L 41/00 |
| 2020/0012505 A1 | 1/2020 | Shil | |
| 2020/0112540 A1* | 4/2020 | Venkataraman | H04L 63/0263 |
| 2020/0127907 A1 | 4/2020 | Koo | |
| 2020/0128056 A1 | 4/2020 | Simotas et al. | |
| 2020/0162344 A1 | 5/2020 | Zapponi et al. | |
| 2020/0301699 A1* | 9/2020 | Raisch | H04L 69/161 |
| 2021/0092048 A1 | 3/2021 | Dutta | |
| 2021/0216278 A1 | 7/2021 | D'Amato et al. | |
| 2021/0311759 A1 | 10/2021 | Corrie et al. | |
| 2021/0344644 A1* | 11/2021 | Reyes | H04L 63/20 |
| 2022/0317990 A1 | 10/2022 | Raghuraman et al. | |
| 2023/0104734 A1* | 4/2023 | Wagh | G06F 9/54 |
| | | | 717/169 |

* cited by examiner

UPGRADING FIREWALL MODULE ON PORT-BY-PORT BASIS

BACKGROUND

Today, network virtualization is rapidly growing due to the flexibility of use and quick realization of user requirements, and has led to a boom in large scale software-defined datacenters. The methods of upgrading software defined network (SDN) software on a host currently tend to fall into one of two categories. Maintenance mode-based upgrades require a redundant host to house the VMs during the upgrade, while live upgrades involve several steps that contribute to long downtimes. Due to the typically massive scale of the datacenters, which can include hundreds of hosts/servers that each host hundreds of virtual machines (VMs), the downtimes experienced due to necessary upgrades have become increasingly longer and more concerning.

BRIEF SUMMARY

Some embodiments of the invention provide a method for upgrading software defined networking (SDN) modules executing on a host computer (e.g., in virtualization software of the host computer). The SDN modules, in some embodiments, include datapath modules (e.g., virtual switches, virtual routers, firewall and other service modules, etc.) and/or control plane modules (e.g., bidirectional forwarding detection (BFD) modules, controller modules, etc.). While a first version of the SDN modules is executing on the host computer to perform traffic processing, a second version of the SDN modules is loaded alongside the first version of the SDN modules such that the first and second versions of the SDN modules are executing on the host computer at the same time. The method of some embodiments saves the runtime states from the first version of the SDN modules, transfers responsibility for performing traffic processing from the first version of the SDN modules to the second version of the SDN modules, and restores the saved runtime states to the second version of the SDN modules. In some embodiments, the method then upgrades the firewall module on a port-by-port basis for each port associated with a machine executing on the host computer for which the firewall module processes traffic. In some embodiments, some or all of these operations are performed by a runtime migrator (RTM) module that is loaded prior to the loading of the second version of the SDN modules and unloaded once all of the SDN modules are upgraded.

The first version of the SDN modules is an existing version of the SDN modules while the second version of the SDN modules is an upgraded version of the SDN modules, according to some embodiments. In order to distinguish between the existing and updated versions of the SDN modules, such as for the namespaces that the modules depend on, some embodiments add a bill number (i.e., a bill number of the software) to the SDN modules. In some embodiments, the bill numbers are also used to send information that is specific to either the existing or upgraded modules (e.g., event information relating to the upgrade process). For example, the RTM module in some embodiments uses the bill numbers to send messages to only the existing modules to prepare the modules for the upgrade process.

In some embodiments, the RTM module saves the runtime states from the first version of the SDN modules differently for different modules. For instance, for a virtual router module, in some embodiments a control plane stores runtime state (e.g., routing tables for various virtual routers executing on the host computer). The RTM module initiates a synchronization process in which the virtual router module retrieves all of this state from the control plane, which is then stopped while the virtual router module is updated.

The transfer of responsibility from the first version of the SDN modules to the second version of the SDN modules can also be different for different modules in some embodiments. For instance, the virtual switch module of some embodiments is associated with numerous distributed virtual switches executing on the host that process traffic for different portsets (groups of ports that are connected by a single virtual switch). The RTM module disassociates property data (e.g., MAC address to port mappings) of the virtual switch from the old virtual switch module, directly swaps the virtual switch from the old virtual switch module to the new virtual switch module, and associates the property data with the new module. This operation is performed separately for each virtual switch (e.g., while transferring responsibility to the new modules on a portset-by-portset basis).

As mentioned above, the firewall module is the last module of the SDN modules to be upgraded in some embodiments. Once all of the portsets have been moved to the new version of the other SDN modules, responsibility for handling firewall processing is moved to the new version of the firewall module on a port-by-port basis. For each port associated with a machine executing on the host computer for which the firewall module processes traffic to and from the port, the RTM module blocks the port to prevent traffic from flowing to or from the port, saves a runtime state of the first version of the firewall module that relates to the port, transfers association of a firewall filter associated with the port from the first version of the firewall module to the second version of the firewall module, restores the saved runtime state for the port to the second version of the firewall module, and then unblocks that port.

In some embodiments, in the time period between when the firewall module has been upgraded for a first port and when the firewall module has been upgraded for the last port, at least one port is serviced by the first version of the firewall module and at least one other port (at some times in the same portset) is serviced by the second version of the firewall module. Once the firewall module has been upgraded on all of the ports, in some embodiments, the first version of the firewall module and the first version of the other SDN modules are unloaded.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
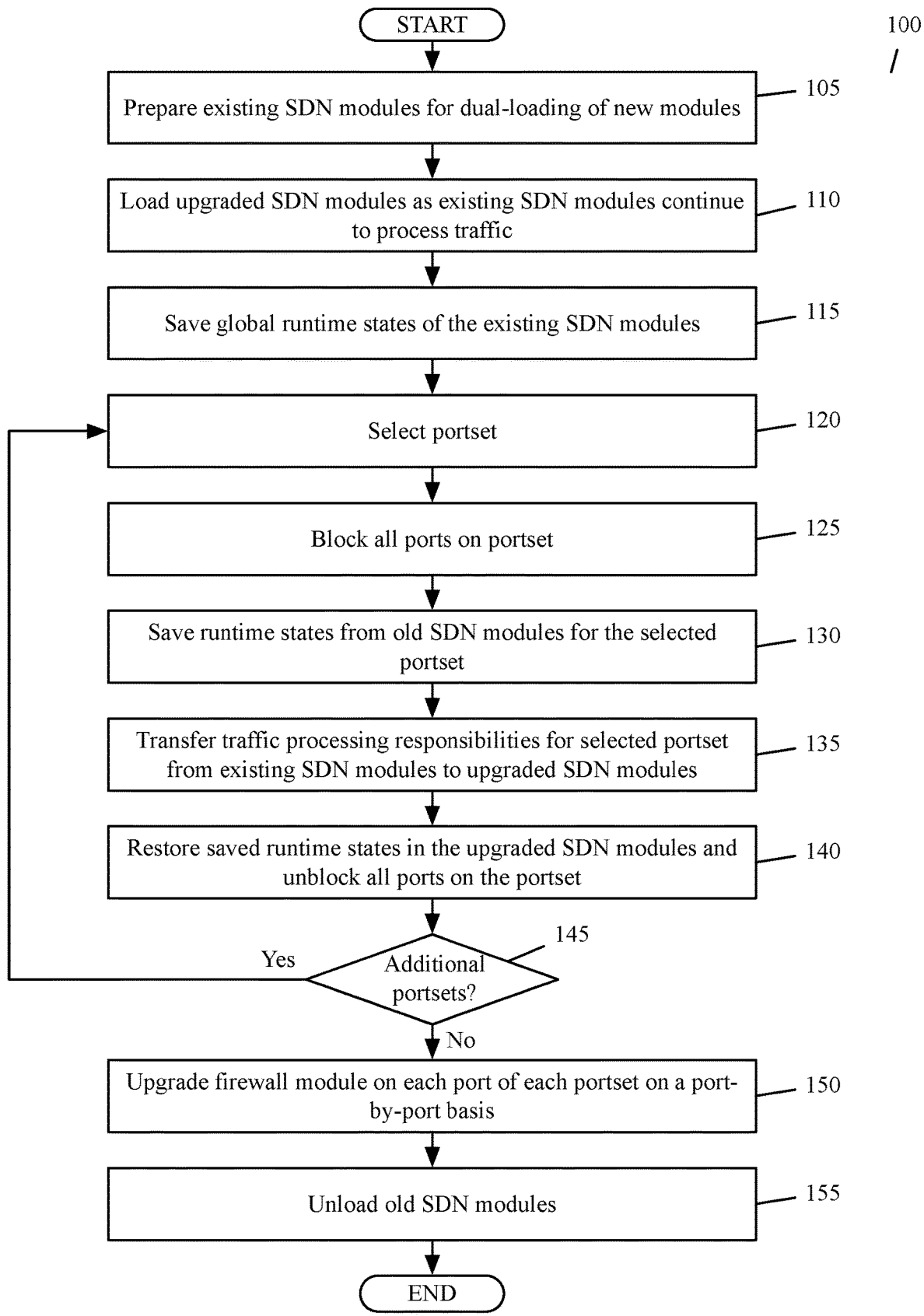
FIG. 1 illustrates a process performed by an RTM module in some embodiments to upgrade SDN modules executing on a host computer.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for upgrading software defined networking (SDN) modules executing on a host computer (e.g., in virtualization software of the host computer). The SDN modules, in some embodiments, include datapath modules (e.g., virtual switches, virtual routers, firewall and other service modules, etc.) and/or control plane modules (e.g., bidirectional forwarding detection (BFD) modules, controller modules, etc.). While a first version of the SDN modules is executing on the host computer to perform traffic processing, a second version of the SDN modules is loaded alongside the first version of the SDN modules such that the first and second versions of the SDN modules are executing on the host computer at the same time. The method of some embodiments saves the runtime states from the first version of the SDN modules, transfers responsibility for performing traffic processing from the first version of the SDN modules to the second version of the SDN modules, and restores the saved runtime states to the second version of the SDN modules. In some embodiments, the method then upgrades the firewall module on a port-by-port basis for each port associated with a machine executing on the host computer for which the firewall module processes traffic. In some embodiments, some or all of these operations are performed by a runtime migrator (RTM) module that is loaded prior to the loading of the second version of the SDN modules and unloaded once all of the SDN modules are upgraded.

The first version of the SDN modules is an existing version of the SDN modules while the second version of the SDN modules is an upgraded version of the SDN modules, according to some embodiments. In order to distinguish between the existing and updated versions of the SDN modules, such as for the namespaces that the modules depend on, some embodiments add a bill number (i.e., a bill number of the software) to the SDN modules. In some embodiments, the bill numbers are also used to send information that is specific to either the existing or upgraded modules (e.g., event information relating to the upgrade process). For example, the RTM module in some embodiments uses the bill numbers to send messages to only the existing modules to prepare the modules for the upgrade process.

In some embodiments, the RTM module saves the runtime states from the first version of the SDN modules differently for different modules. For instance, for a virtual router module, in some embodiments a control plane stores runtime state (e.g., routing tables for various virtual routers executing on the host computer). The RTM module initiates a synchronization process in which the virtual router module retrieves all of this state from the control plane, which is then stopped while the virtual router module is updated.

The transfer of responsibility from the first version of the SDN modules to the second version of the SDN modules can also be different for different modules in some embodiments. For instance, the virtual switch module of some embodiments is associated with numerous distributed virtual switches executing on the host that process traffic for different portsets (groups of ports that are connected by a single virtual switch). The RTM module disassociates property data (e.g., MAC address to port mappings) of the virtual switch from the old virtual switch module, directly swaps the virtual switch from the old virtual switch module to the new virtual switch module, and associates the property data with the new module. This operation is performed separately for each virtual switch (e.g., while transferring responsibility to the new modules on a portset-by-portset basis).

As mentioned above, the firewall module is the last module of the SDN modules to be upgraded in some embodiments. Once all of the portsets have been moved to the new version of the other SDN modules, responsibility for handling firewall processing is moved to the new version of the firewall module on a port-by-port basis. For each port associated with a machine executing on the host computer for which the firewall module processes traffic to and from the port, the RTM module blocks the port to prevent traffic from flowing to or from the port, saves a runtime state of the first version of the firewall module that relates to the port, transfers association of a firewall filter associated with the port from the first version of the firewall module to the second version of the firewall module, restores the saved runtime state for the port to the second version of the firewall module, and then unblocks that port.

In some embodiments, in the time period between when the firewall module has been upgraded for a first port and when the firewall module has been upgraded for the last port, at least one port is serviced by the first version of the firewall module and at least one other port (at some times in the same portset) is serviced by the second version of the firewall module. Once the firewall module has been upgraded on all of the ports, in some embodiments, the first version of the firewall module and the first version of the other SDN modules are unloaded.

FIG. 1 conceptually illustrates a process 100 of some embodiments for upgrading a set of modules (e.g., SDN modules) executing on a host computer. The process 100 is performed, in some embodiments, by an RTM module. In some embodiments, this RTM module is loaded onto the host computer to manage and coordinate the upgrade process, and unloaded once the upgrade process is completed.

Figure 2:
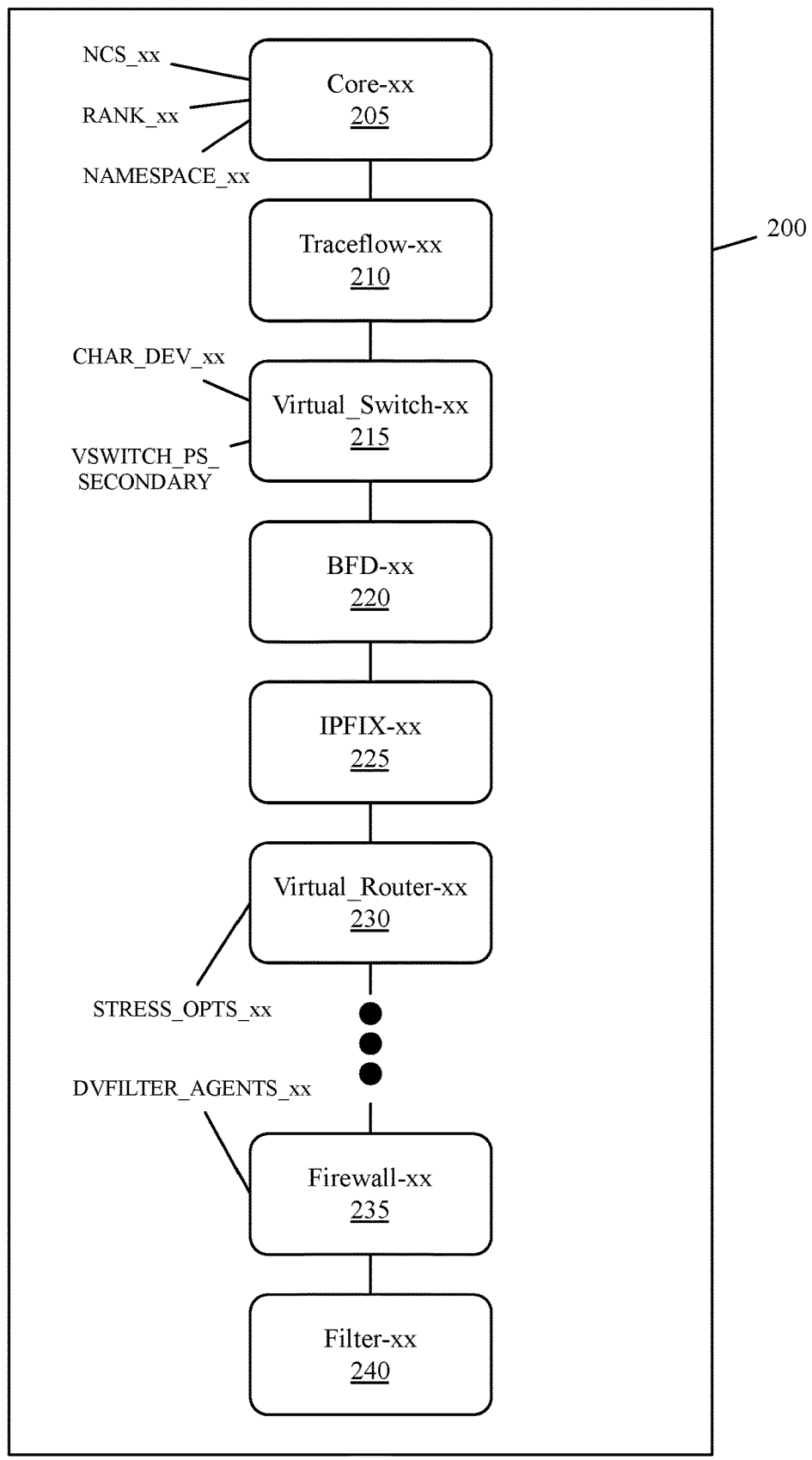
FIG. 2 conceptually illustrates an example set of SDN modules that are upgraded in the process described in FIG. 1, in some embodiments.

In some embodiments, the SDN modules being upgraded can include a variety of control plane and datapath modules. FIG. 2, for example, illustrates a set of SDN modules 200 that are upgraded during the process 100 described below (or a similar upgrade process), according to some embodiments. As shown, the set of SDN modules 200 includes a core module 205, a traceflow module 210 (for handling flow tracing requests from a network administrator), a virtual switch module 215 (for managing one or more virtual switches executing on the host), a bidirectional forwarding detection (BFD) module 220 (for generating BFD messages to send to other hosts and for handling BFD messages received from other hosts), an IPFIX (Internet Protocol flow information export) module 225 (for generating and exporting flow information), a virtual router module 230 (for handling logical routing on the host computer), a firewall module 235 (for managing firewall rules for the various machines on the host), and a filter module 240 (for handling various filters, such as firewall filters, that handle traffic to and from ports on the host). In some embodiments, as indicated by the ellipsis between the virtual router 230 and the firewall module 235, the set of SDN modules 200 includes additional modules not shown. For example, some embodiments also include sender policy framework (SPF) modules, switch security modules, KCP modules, etc.

Returning to FIG. 1, the process 100 starts, at 105, by preparing the existing SDN modules for dual-loading of the upgraded modules. Typically, the existing SDN modules are an older version of the suite of modules, to be replaced by a newer version. In some embodiments, the RTM module prepares the existing modules by issuing cleanup events to the existing SDN modules indicating that the dual-loading is about to begin and the existing modules should perform cleanup actions. The cleanup actions, in some embodiments, can include actions that all or most of the SDN modules should perform as well as actions that vary based on the different types of SDN modules (e.g., a virtual switch may perform different actions than a BFD module). In some embodiments, the actions relate to closing resources that cannot be shared between the existing and upgraded modules, but that are required for functioning, in order to allow the upgraded modules to take over use of these resources without any conflicts once the upgraded modules are loaded.

For example, in some embodiments, one cleanup action performed by at least a subset of the SDN modules relates to character devices that are used by the modules to write logs and communicate with the control plane (e.g., a control plane that executes in the user space of the host computer virtualization software) to exchange information, and which cannot be shared between both the old modules and the upgraded modules. When an SDN module receives the cleanup event from the RTM module, the control plane/user space has already been stopped for the upgrade process, so the SDN module can close its respective character device in order to allow the upgraded module to take over and use the character device once the upgraded module is loaded and before the control plane/user space is restarted and can resume communications with the SDN modules.

Figure 3:
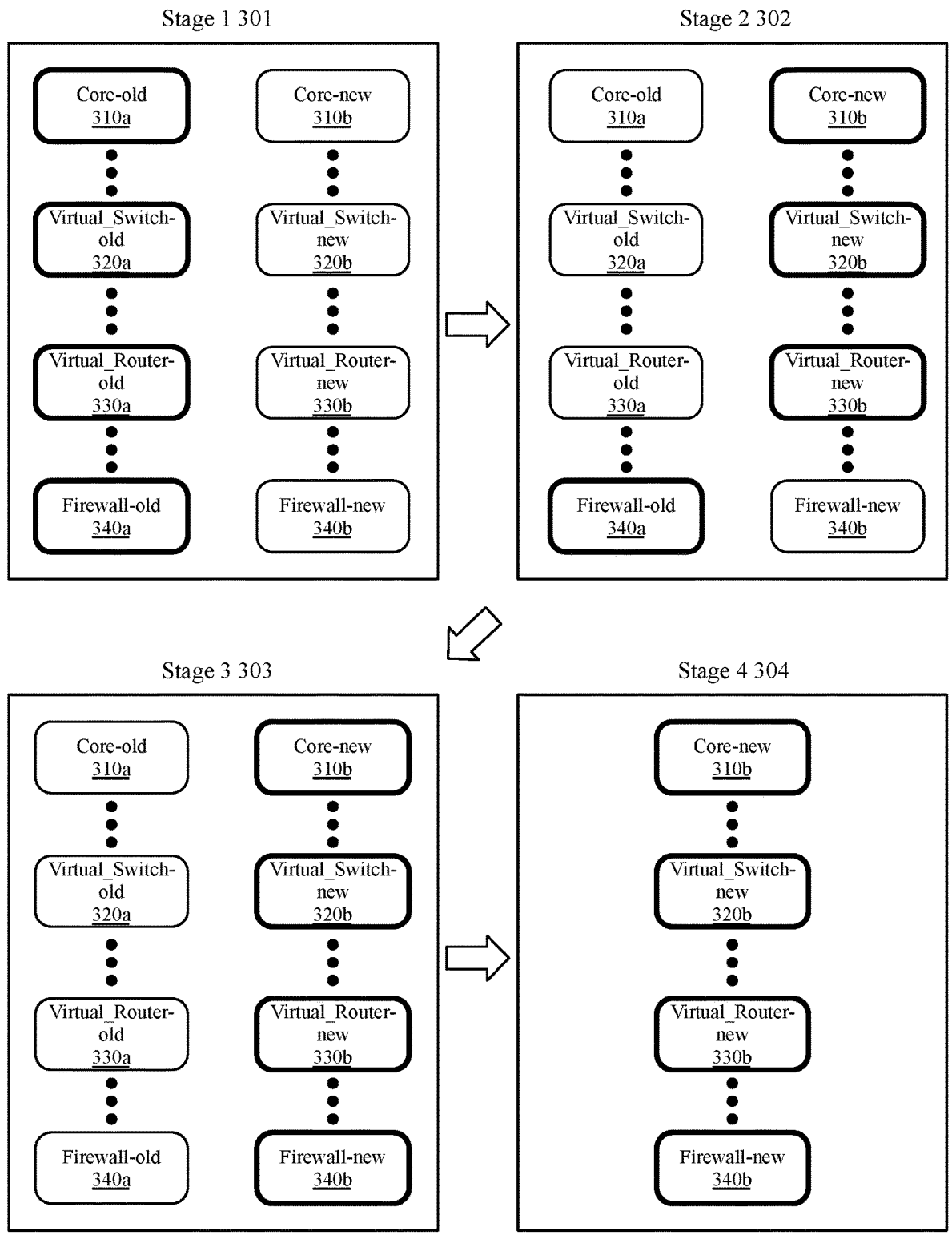
FIG. 3 conceptually illustrates a set of stages that provide a visual representation of the dual-loading and upgrading of the SDN modules as described in the process of FIG. 1, in some embodiments.

Next, at 110, the process 100 loads the upgraded SDN modules onto the host computer alongside the existing modules as the existing modules continue to process traffic. For example, FIG. 3 illustrates a set of stages 300 to provide a visual representation of the dual-loading and upgrading of the SDN modules according to some embodiments. In the first stage 301, a set of upgraded ("new") modules are shown alongside a set of existing ("old") modules. The set of existing modules includes at least a core module 310a, a virtual switch module 320a, a virtual router module 330a, and a firewall module 340a, while the set of upgrade modules includes a core module 310b, a virtual switch module 320b, a virtual router module 330b, and a firewall module 340b. The set of existing modules in the first stage 301 appear bolded to indicate that they are the modules that are currently processing traffic.

The process 100 then saves, at 115, global runtime states for at least a set of the existing SDN modules. In some embodiments, these modules store runtime state for multiple "clients". For instance, the virtual switch module might manage multiple software virtual switches (the clients) operating on the host to switch data messages, and store state for each of these switches. In addition, for each client of a module, state may be stored for multiple different ports (e.g., ports to which VMs, containers, or other machines attach). In some embodiments, the global runtime states include global configuration data for all ports associated with all clients of each of at least a set of the existing modules.

Next, the process 100 selects a portset to upgrade at 120. A portset, in some embodiments, includes a set of ports associated with a virtual switch. In some embodiments, the RTM module upgrades the SDN modules for each portset on a portset-by-portset basis. The RTM module may select portsets in various different orders in different embodiments.

After selecting a portset, the RTM module, at 125, blocks all of the ports on the portset to prevent traffic from flowing to or from the ports. While this does result in some downtime for each port, downtime per port is minimized by upgrading only one portset at a time. While one portset is being switched over to the new set of modules, the other portsets can continue sending/receiving traffic, unaffected by the upgrade.

At 130, the process 100 saves runtime states from the existing SDN modules for the selected portset, with the exception of the runtime state of the firewall module. As will be described below, some embodiments handle the firewall module upgrade differently because the firewall module often stores many (e.g., hundreds, thousands) of rules per port.

The process 100 then transfers, at 135, traffic processing responsibilities for the selected portset from the existing SDN modules to the upgraded SDN modules. As shown in the second stage 302 of the set of stages 300, each of the existing SDN modules 310a-330a are no longer bolded, while the corresponding upgraded modules 310b-330b now appear bolded to indicate that these upgraded modules are now responsible for traffic processing for the portset. Conversely, the existing firewall module 340a still appears bolded to indicate it is still responsible for traffic processing and has not yet been upgraded.

Following (or in conjunction with) the transferring of traffic processing responsibilities from the existing SDN modules to the upgraded SDN modules, the process restores, at 140, the saved runtime states for the selected portset in the upgraded SDN modules and unblocks all of the ports on the portset to allow traffic to flow again to and from the ports. In some embodiments, the saved global runtime states are restored for the upgraded SDN modules at the same time that the RTM module transfers the traffic processing responsibilities. The runtime state save and restoration process is also described in greater detail below.

The process 100 then determines, at 145, whether there are additional portsets for which the SDN modules need to be upgraded. When the RTM module determines at 145 that there are additional portsets for which the SDN modules need to be upgraded, the process returns to step 120 to select another portset and transfer responsibility for this next portset to the upgraded modules.

Otherwise, when responsibility for handling traffic for all of the portsets has been switched over to the new (upgraded) modules, the process transitions to 150 to upgrade the firewall module on each port of each of the portsets on a port-by-port basis. As shown in the third stage 303 of the stages 300, all of the upgraded modules 310*b*-340*b*, now appear bolded as the firewall module has also been upgraded for the portsets. As mentioned, the firewall module upgrade is described further below.

Once the firewall module has been upgraded on all of the ports of all of the portsets at 150, the process 100 unloads the old SDN modules at 155. For example, in the fourth and final stage 304 of the stages 300, only the new, upgraded SDN modules 310*b*-340*b* remain as the old modules have now been unloaded. After the old SDN modules have been unloaded at 155, the process 100 ends. In some embodiments, the downtime experienced during the process 100 for a scale of approximately 1000 VM ports on a single hypervisor is of the order of less than 1 second.

In some embodiments, different modules store and save their runtime states in different manners. For instance, some modules store all of their runtime state, and therefore can easily save this state for upgrade. On the other hand, the virtual router module of some embodiments collects state from a logical control plane executing on the host computer (e.g., in the user space of the host computer virtualization software). The virtual router module handles configuration for multiple virtual distributed routers that execute on the host computer (e.g., to handle logical routing for different logical networks), and uses a logical control plane to store state (e.g., routing tables) for these virtual distributed routers. This logical control plane, in some embodiments, is responsible for modifying the routing tables used by the virtual distributed routers as the logical networks change (e.g., as edge routers exchange routes and propagate these routes down to the host computers).

Figure 4:
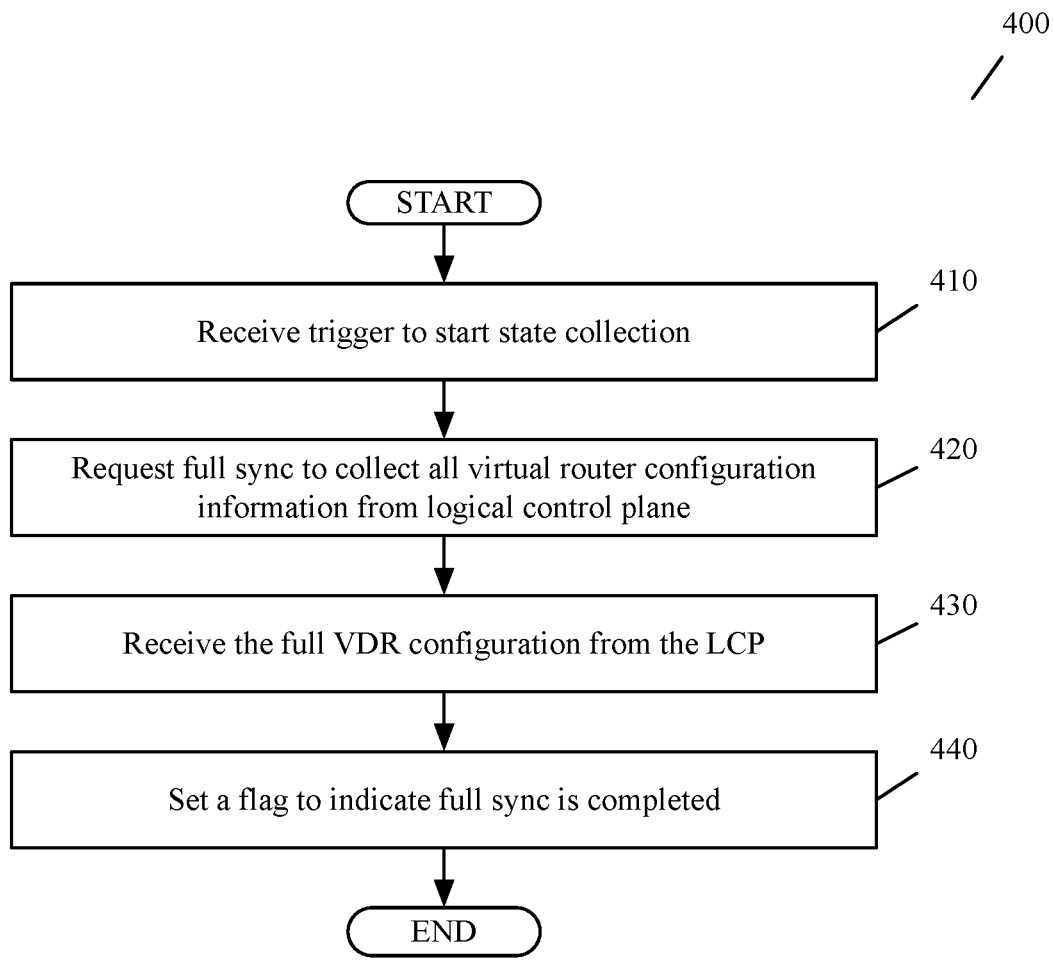
FIG. 4 illustrates a process performed by a virtual router in some embodiments as part of the upgrading process.
Figure 5:
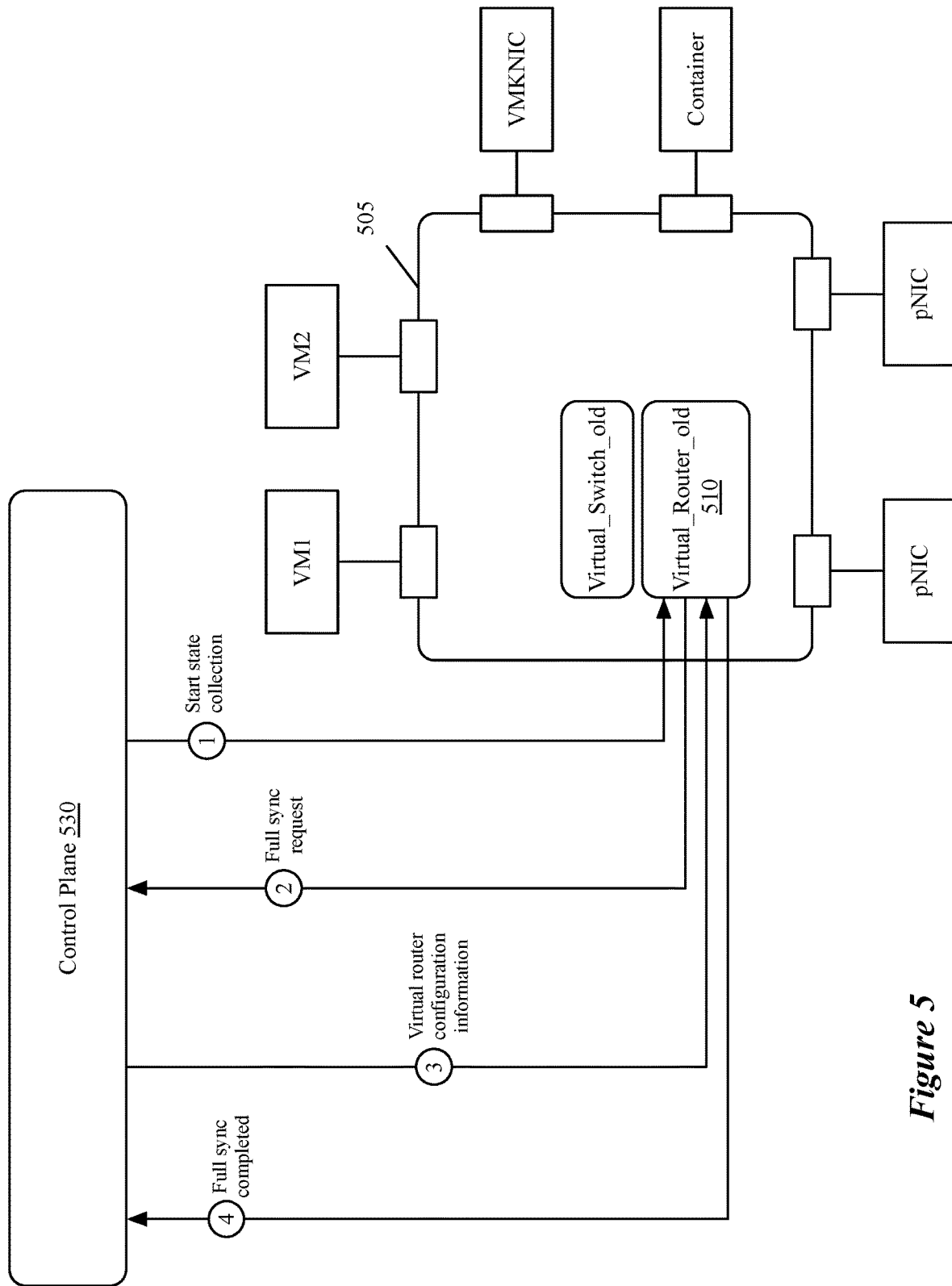
FIG. 5 illustrates communications between a virtual router and a control plane as part of the upgrade process, in some embodiments FIG. 6 conceptually illustrates the actions of the RTM module to restore the saved runtime states without having to rely on the control plane, according to some embodiments.

FIG. 4 conceptually illustrates a process 400 of some embodiments for saving state as part of the upgrading process. Specifically, this process 400 is performed by a virtual router module (i.e., the existing virtual router module) to collect its state and store this state to be used by the new virtual router module. The process 400 will be described with reference to FIG. 5, which illustrates communications between a virtual router and a control plane during an upgrade according to some embodiments.

The process 400 starts, at 410, when the virtual router module receives a trigger to start state collection. For example, in FIG. 5 the arrow with the encircled 1 leading from the control plane 530 to the virtual router 510 on the host computer 505 indicates to the virtual router 510 to start state collection. In some embodiments, the virtual router receives this trigger before the upgraded modules are loaded (i.e., prior to step 110 of the process 100). In other embodiments, the control plane is notified by the RTM module to send this trigger to the virtual router module.

After receiving the trigger, the process 400 requests, at 420, a full sync of the state from the control plane to collect all virtual router configuration information from the control plane. In some embodiments, the control plane will be stopped for upgrade purposes before the upgrade starts, and the virtual router module retrieves the state from the control plane prior to this taking place, so that the control plane does not need to be involved in the state save/restore process. For example, the arrow with the encircled 2 from the virtual router 510 to the control plane 530 indicates a request by the virtual router for full sync from the control plane.

In response to the request for full sync, the process 400 receives, at 430, all of the virtual router configuration information from the control plane. For example, the virtual router 510 receives the virtual router configuration information from the control plane 530 along the arrow with the encircled 3 that leads from the control plane to the virtual router. As noted, this runtime state can include routing tables for the various virtual distributed routers executing on the host computer in some embodiments.

Once the virtual router has received all of the virtual router configuration information from the control plane, the process 400 sets a flag, at 440, to indicate that the full sync is completed. This interaction is represented by the arrow with the encircled 4 from the virtual router 510 to the control plane 530 indicating the full sync is completed. After setting the flag, the process 400 ends. As a result of the full sync, the upgrade process is no longer dependent on the control plane, and can proceed without having to wait on the control plane to be restarted in order to restore the states after the upgrade has been completed, according to some embodiments.

Figure 6:
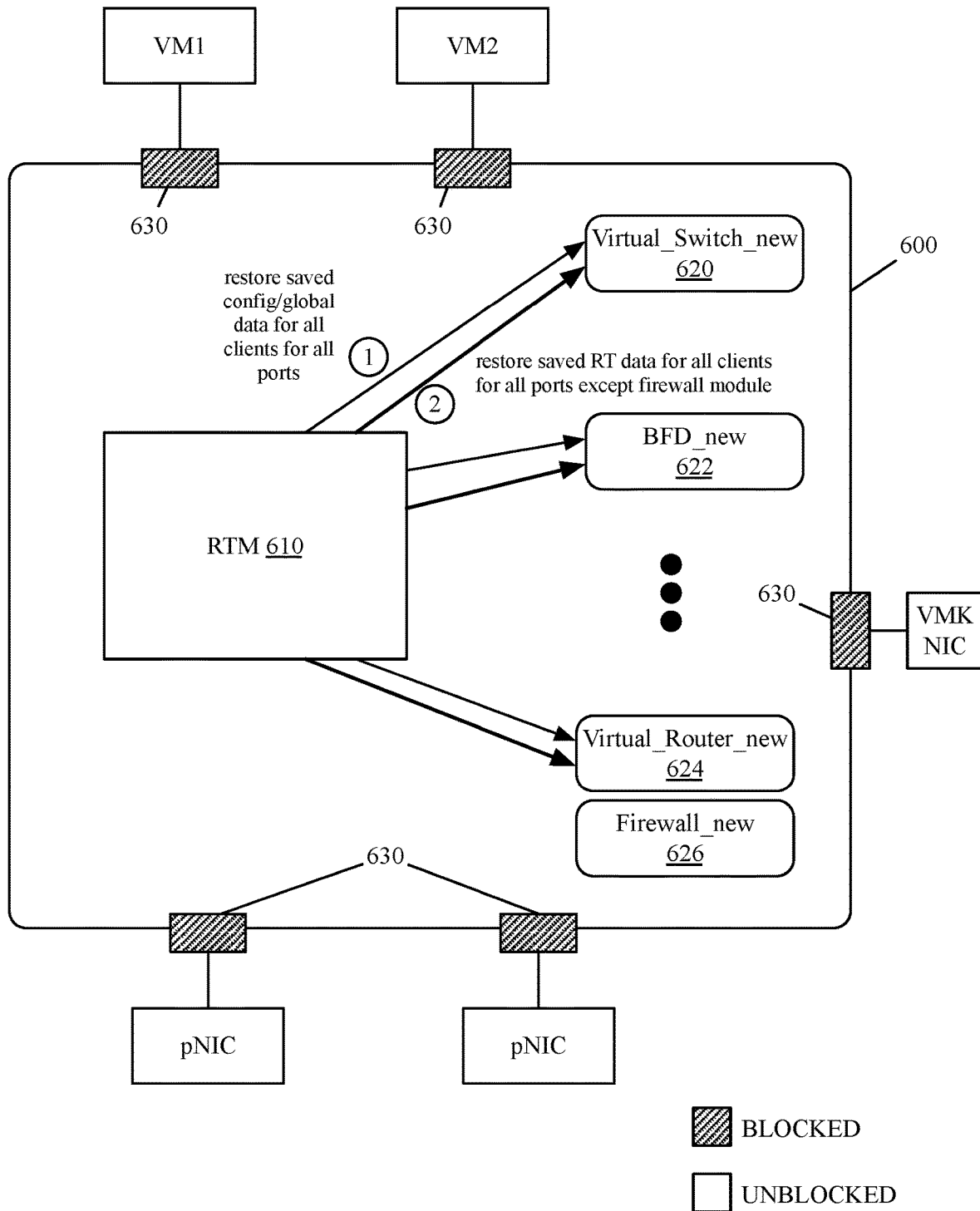

FIG. 6 conceptually illustrates actions of the RTM module to restore the saved runtime states without having to rely on the control plane according to some embodiments. FIG. 6 illustrates a host computer 600 on which an RTM module 610 is loaded. The host computer 600 also includes a new (i.e., upgraded) virtual switch 620, a new BFD module 622, a new virtual router 624, and a new firewall module 626. Additionally, as shown, all of the ports 630 (i.e., VM, VMKNIC, and pNIC ports, as well as container ports which are not shown in this figure) on the host computer 600 are currently blocked. While only four modules are shown on the host computer 600, it should be noted that additional modules, such as any of the other modules illustrated in FIG. 2, may also be present on the host computer 600. It should also be noted that, in some embodiments, only the ports of one portset are blocked at a given time.

As shown by the encircled 1 and encircled 2 alongside the arrows that lead from the RTM module 610 to the virtual switch 620, the RTM module restores (1) the saved global configuration data/runtime state for all clients for all ports, and (2) the saved runtime states for all clients for all ports except the firewall module 626, which does not include a pair of arrows from the RTM module. That is, the RTM module 610 restores the global and portset runtime states for each of the modules 620-624, and the firewall module, as mentioned above, is upgraded on a port-by-port basis after all of the other SDN modules have been upgraded for all of the portsets. Once the runtime states have been restored, the RTM module unblocks the ports, as described above, and begins to upgrade the firewall module on each port on a port-by-port basis.

Figure 7:
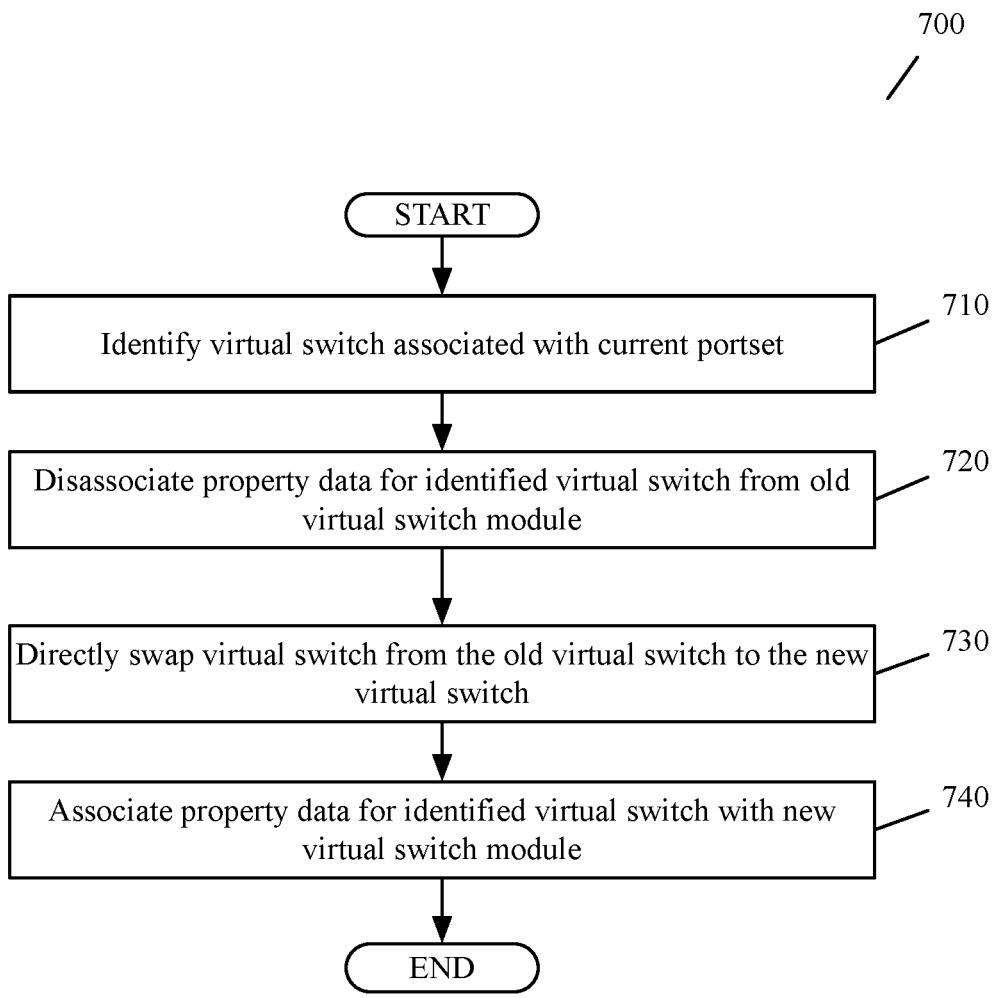
FIG. 7 illustrates a process performed in some embodiments by the RTM module to upgrade the virtual switch.
Figure 8:
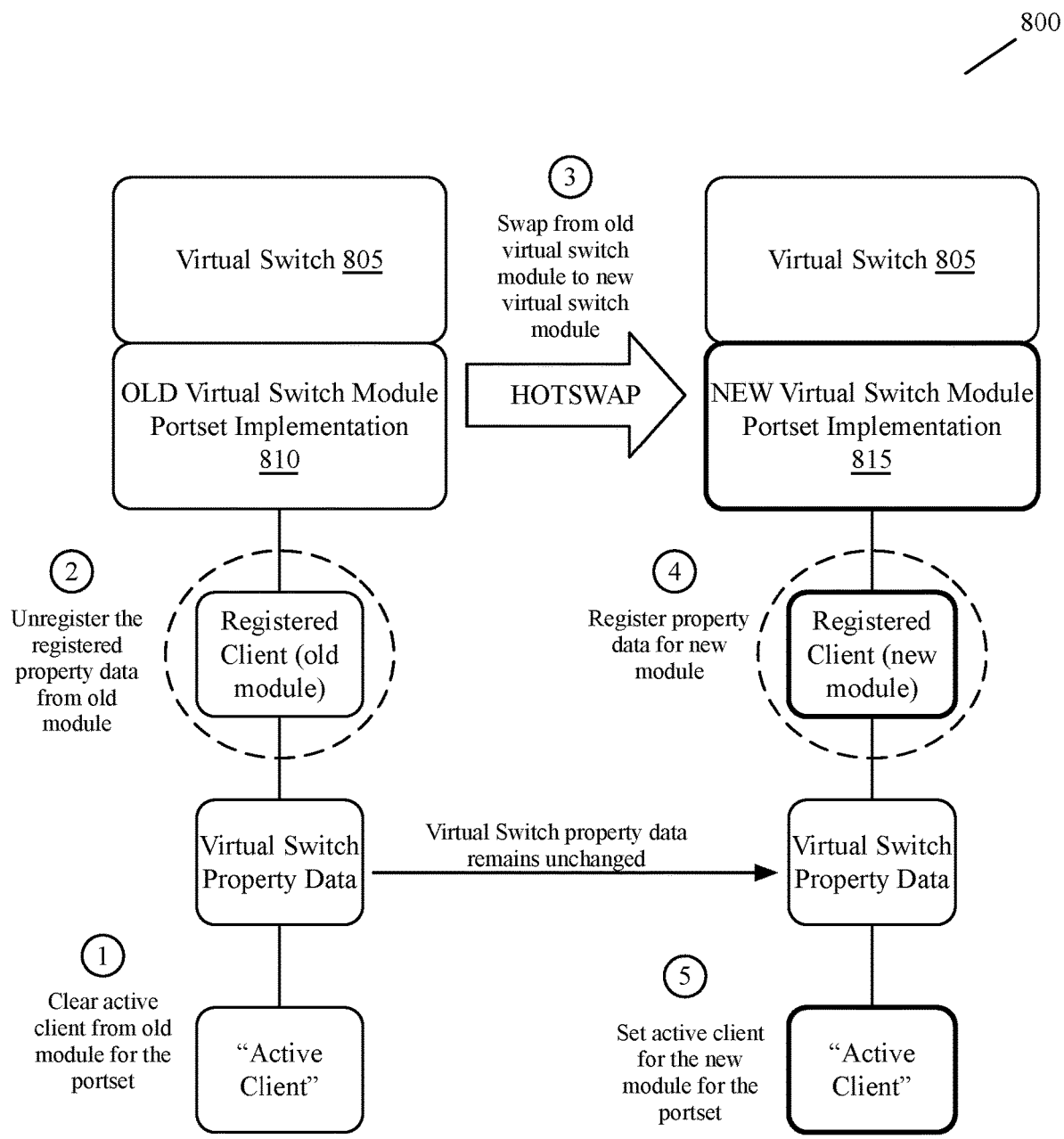
FIG. 8 illustrates a diagram representing the process described in FIG. 7, according to some embodiments.

FIG. 7 illustrates a process 700 of some embodiments for transferring responsibility for a particular distributed virtual switch on a host from the old to new virtual switch module. In some embodiments, this process 700, is part of transferring responsibility for handling data traffic for the portset associated with the particular distributed virtual switch. The process 700 is performed, in some embodiments, by the RTM module. The process 700 will be described with reference to FIG. 8, which illustrates a diagram 800 representing this process.

The process 700 starts, at 710, by identifying a virtual switch associated with the current portset being upgraded. As described above, a portset is a set of ports associated with a single virtual switch, according to some embodiments. In some embodiments, the RTM module performs this process for each virtual switch when upgrading the portset associated with the different virtual switches.

After identifying the virtual switch, the process 700 dissociates, at 720, property data for the identified virtual switch from the existing virtual switch. In the diagram 800, for example, the RTM module clears the active client from the old module 810 for the portset at the encircled 1 and unregisters the registered property data from the old virtual switch module 810 for the portset at the encircled 2. The property data, in some embodiments, includes configuration data specific to the implementation of the identified virtual switch for the selected portset (e.g., MAC address to port mappings that enable the virtual switch to switch data traffic to the correct port). The property data remains unchanged during the process 700, according to some embodiments.

Next, at 730, the process 700 directly swaps the virtual switch from the old virtual switch module to the new virtual switch module, without the need for any intermediate/stand-in switch. In the diagram 800, for example, a hotswap is performed at the encircled 3 to swap from the old module 810 to the new module 815. The virtual switch 805 in some embodiments is responsible for handling the configuration information (e.g., forwarding information) and providing that configuration information to the virtual switch module for each of the different portsets. As the configuration information (i.e., property data) remains unchanged, so does the DVS switch 805.

Following the hotswap, the process associates, at 740, the property data for the identified virtual switch with the new virtual switch module. In the diagram 800, for example, the property data for the portset is registered for the new module at the encircled 4, and the active client, which had been cleared from the old module, is set for the new module at the encircled 5, and the hotswap is completed. As such, following 740, the process 700 ends.

Figure 9:
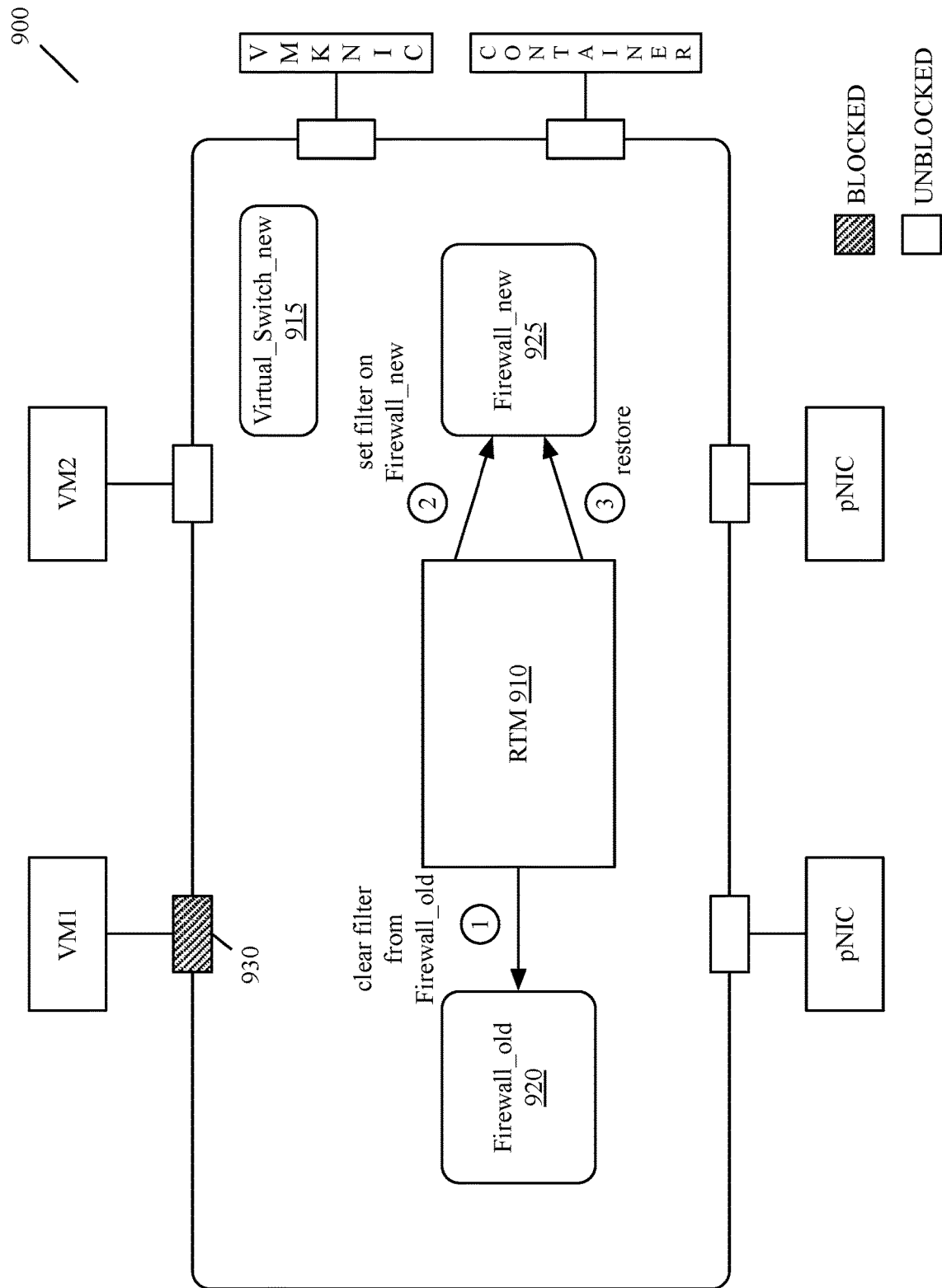
FIG. 9 illustrates a host computer on which an RTM module is loaded to upgrade the SDN modules, including the firewall module, in some embodiments.

As noted above, after all of the other SDN modules for all of the portsets have been upgraded, the RTM module of some embodiments then upgrades the firewall module for each portset on a port-by-port basis. FIG. 9 conceptually illustrates a host computer 900 on which an RTM module 910 is loaded to upgrade the SDN modules. As illustrated, the virtual switch 915 on the host computer 900 is labeled as being a new virtual switch as the hotswap from the old virtual switch module (i.e., as described by the process 700) to the new virtual switch module has already been performed.

The RTM module 910 upgrades the firewall module for the first port 930 by clearing (i.e., removing) the firewall filter from the old firewall module 920 at the encircled 1, setting the firewall filter on the new firewall module 925 at the encircled 2, and restoring the runtime state for the new firewall module 925 at the encircled 3. The RTM module repeats these steps for each port of each portset, as will be described in further detail below with reference to FIGS. 10 and 11.

Figure 10:
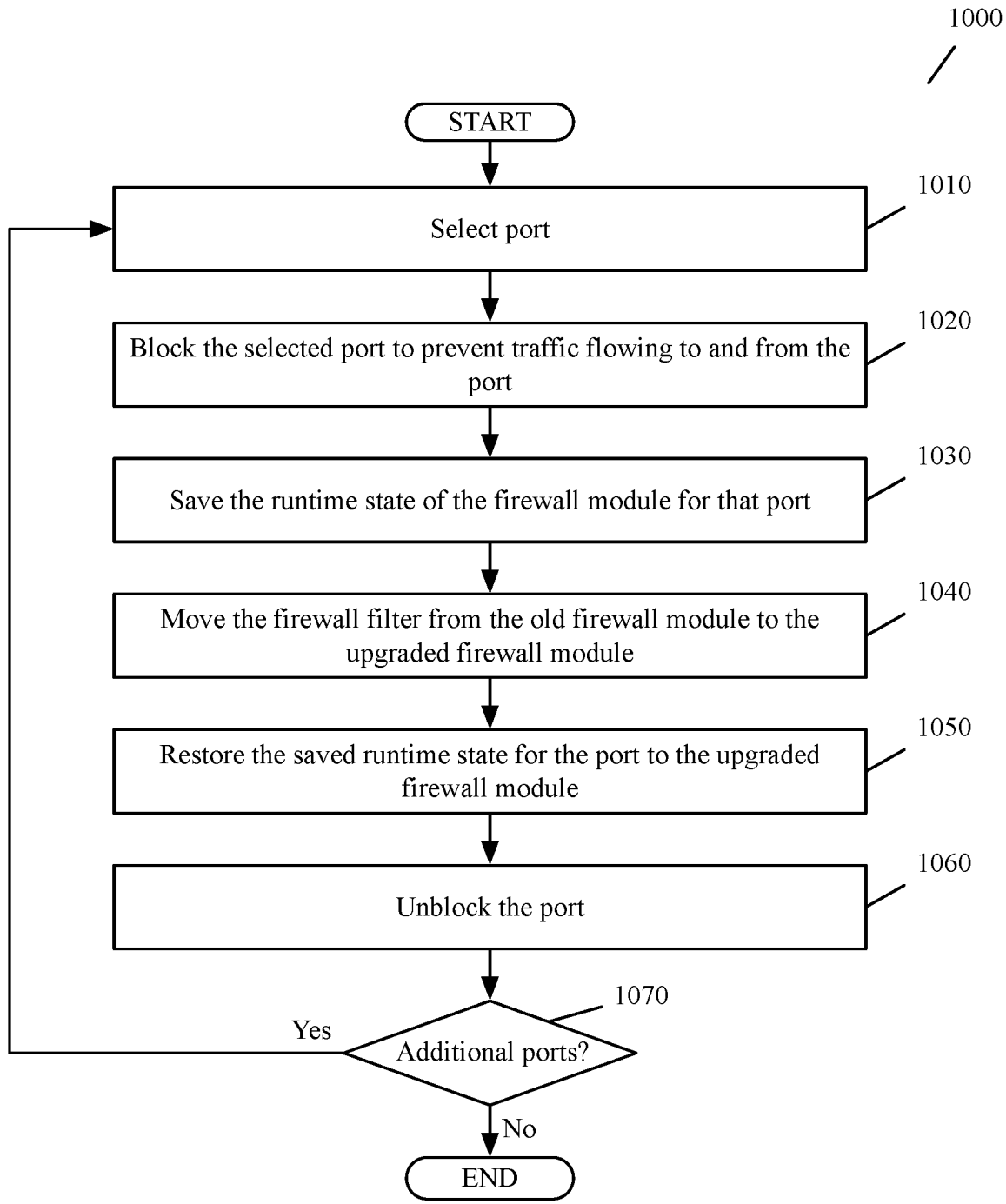
FIG. 10 illustrates a process performed by the RTM module to upgrade the firewall module in some embodiments.
Figure 11:
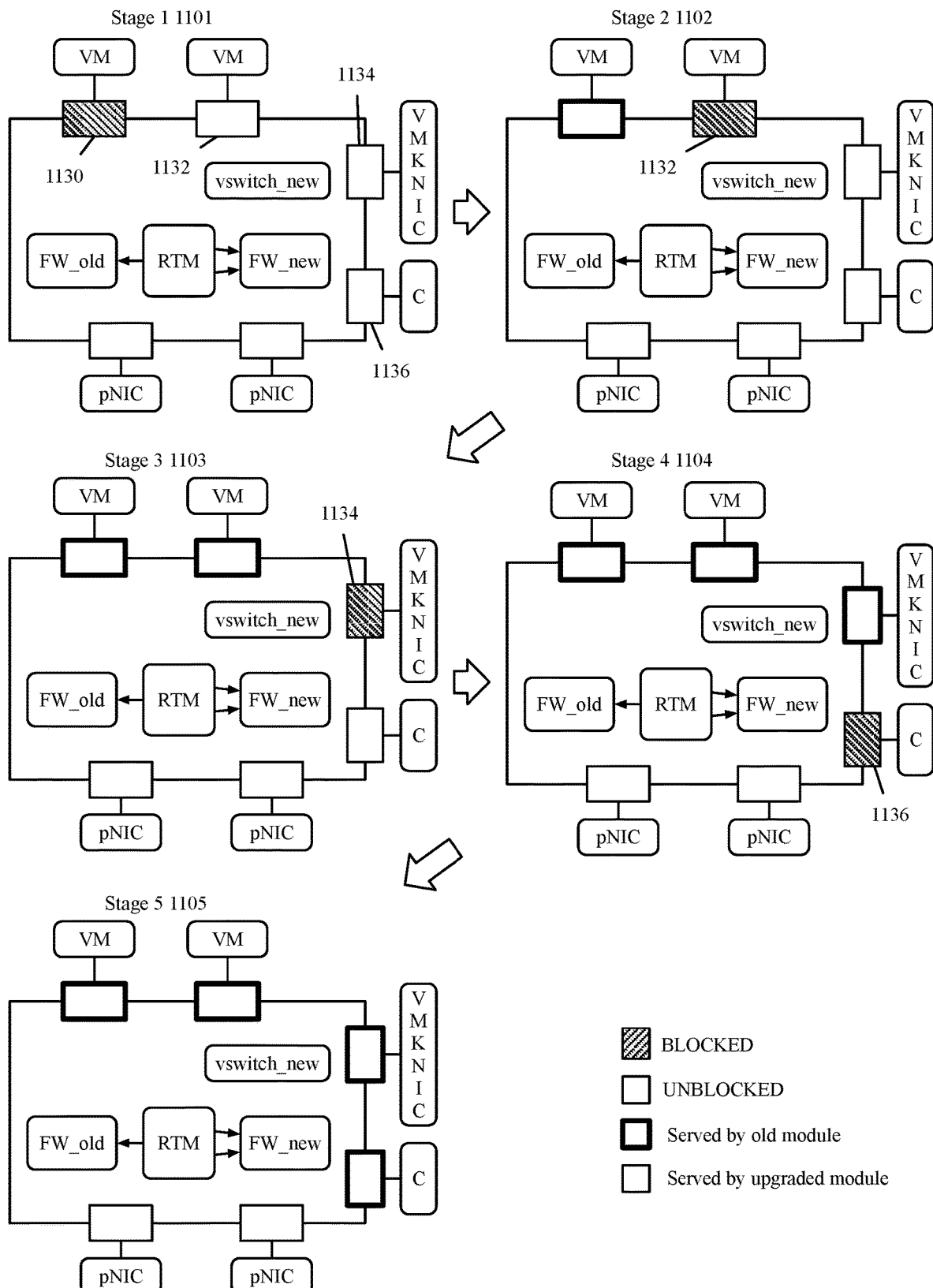
FIG. 11 conceptually illustrates a set of stages as the firewall module is upgraded for a portset, in some embodiments.

FIG. 10 conceptually illustrates a process 1000 of some embodiments for upgrading the firewall module. The process 1000, which is performed by the RTM module in some embodiments, provides a more detailed elaboration of operation 150 in the process 100 described above. Process 1000 will be described below with reference to FIG. 11, which illustrates a set of stages 1101-1105 as the firewall module is upgraded according to some embodiments.

The process 1000 starts, at 1010, by selecting a port. In some embodiments, responsibility for ports are transferred over within one portset at a time, while in other embodiments the ports are selected in a different order. That is, in some embodiments, the RTM module transfers responsibility for handling firewall rules for all of the ports in a single portset (one port at a time) before moving onto the ports of a next portset.

The process 1000 then blocks the selected port at 1020 to prevent traffic from flowing to and from the port during the transfer process. For example, in the first stage 1101 of FIG. 11, a first VM port 1130 is shown as blocked, similar to the illustration of FIG. 9 described above. While this does require a certain amount of downtime for each port, this downtime is small relative to the time that would be required to transfer state (firewall rules) for all of the ports (or even all of the ports in a single portset) at once.

After blocking the selected port, the process 1000 saves, at 1030, the runtime state of the firewall module for the selected port. In some embodiments, this runtime state may include all of the currently-active firewall rules that relate to the port (e.g., for both ingress and egress traffic). In addition, if the firewall includes stateful rules, then the runtime state may include connection state for incoming and/or outgoing connections of the currently selected port.

Next, the process 1000 moves, at 1040, the firewall filter from the old firewall module to the upgraded firewall module. The firewall filter in some embodiments is a distributed virtual (DV) firewall filter that performs various operations such as filtering, encapsulation, and decapsulation of data messages sent to and from the port. The filter, in some embodiments, is responsible for intercepting these data messages and applying the correct firewall rules (e.g., as stored by the firewall module) to the data messages. Once the filter has been moved from the old firewall module and set on the upgraded firewall module, the RTM module restores, at 1050, the saved runtime state of the firewall module for the selected port to the upgraded firewall module.

The process 1000 then unblocks the selected port at 1060. Once the port has been unblocked, in some embodiments, the upgraded firewall module begins serving the port and the old firewall module ceases to serve the port, but may continue to serve other ports for which the firewall module has not yet been upgraded. For example, in the second stage 1102 of FIG. 11, the port 1130 appears with a bolded outline to indicate that it is now being served by the upgraded firewall module, while the other ports do not appear with a bolded outline indicating they are still being served by the old firewall.

After unblocking the selected port at 1060, the process 1000 determines, at 1070, whether there are additional ports for which responsibility needs to be transferred to the upgraded firewall module. When additional ports remain, the process 1000 returns to 1010 to select a port. For example, in the second stage 1102 discussed above, the VM port 1132 is illustrated as being blocked while all other ports are unblocked, indicating the firewall module is currently being upgraded for the port 1132. Once all ports have been transferred over to the upgraded firewall module, the process 1000 ends.

In some embodiments, from the time that responsibility for the first port is transferred to the upgraded firewall module to the time that responsibility for the last port is transferred to the upgraded firewall module, at least one port will be served by the old firewall module and at least another port will be served by the new firewall module such that both versions of the firewall module are simultaneously serving ports (including ports within a single portset) for a period of time. As further illustrated in FIG. 11, once a port has been upgraded, it is unblocked and subsequently served by the upgraded firewall module.

For example, in stage 3 1103, both of the VM ports 1130-1132 are illustrated with a bolded outline indicating the firewall module has been upgraded for these ports and they are now being served by the upgraded firewall module. Additionally, the VMKNIC port 1134 is blocked for upgrading of the firewall module. In stage 4 1104, the VM ports and the VMKNIC port are all shown with a bolded outline and are being served by the upgraded firewall module, while the firewall module is being upgraded on the blocked container port 1136. In the fifth and final stage 1105, all of the VM, VMKNIC, and container ports are bolded, indicating the firewall module upgrade for this portset is complete, and all of the ports are now being served by the upgraded firewall module.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
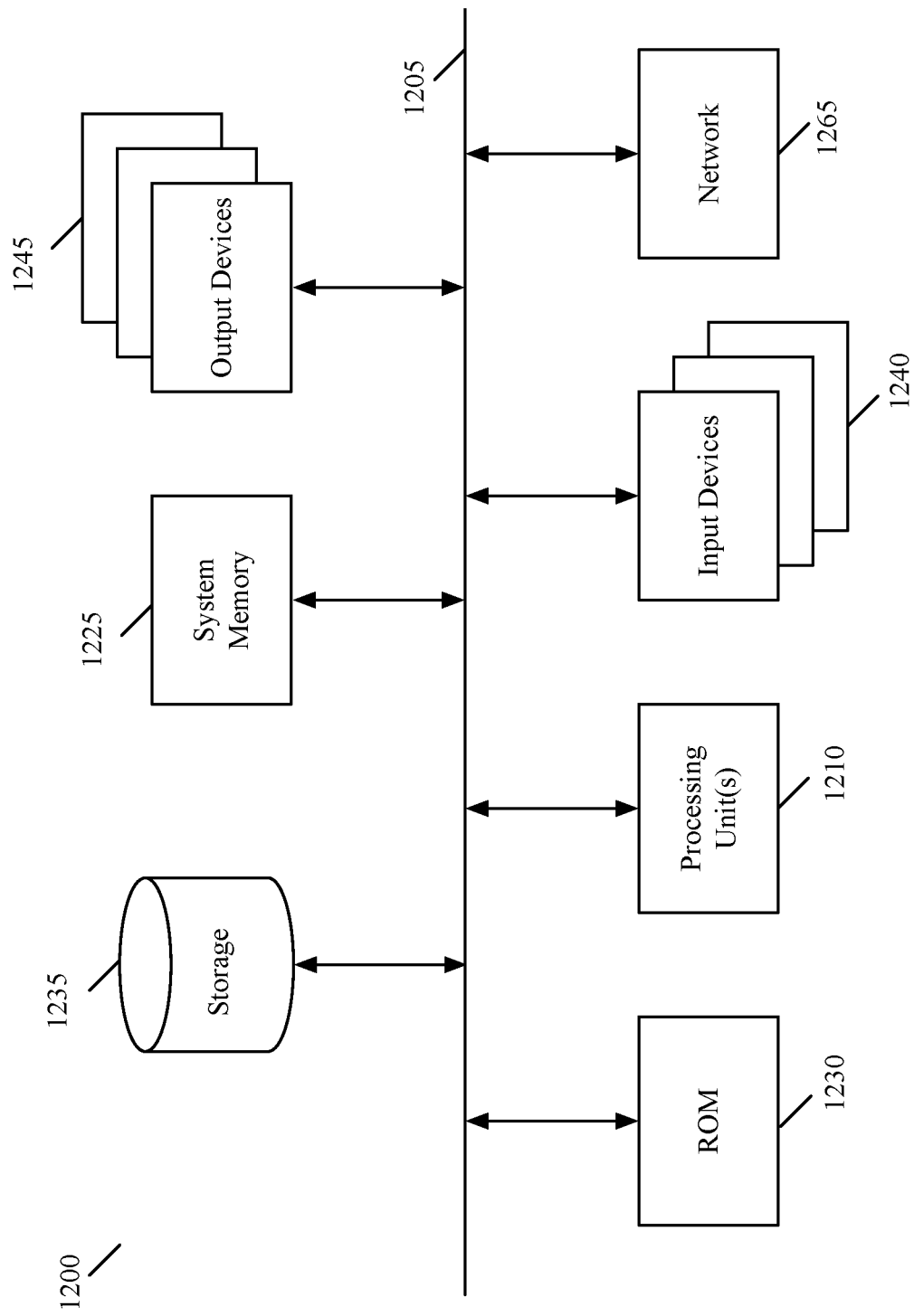
FIG. 12 conceptually illustrates a computer system with which some embodiments of the invention are implemented.

FIG. 12 conceptually illustrates a computer system 1200 with which some embodiments of the invention are implemented. The computer system 1200 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments. The read-only-memory (ROM) 1230 stores static data and instructions that are needed by the processing unit(s) 1210 and other modules of the computer system. The permanent storage device 1235, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the computer system. The input devices 1240 include alphanumeric keyboards and pointing devices (also called "cursor control devices"). The output devices 1245 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 12, bus 1205 also couples computer system 1200 to a network 1265 through a network adapter (not shown). In this manner, the computer can be a part of a network of computers (such as a local area network ("LAN"), a wide area network ("WAN"), or an Intranet), or a network of networks (such as the Internet). Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of upgrading a firewall module executing on a host computer to process traffic sent to and from a plurality of machines executing on the host computer, the method comprising:
    while a first version of a firewall module is executing on the host computer to process the traffic to and from the plurality of machines, loading a second version of the firewall module alongside the first version of the firewall module; and
    for each port of a plurality of ports associated with machines executing on the host computer for which the firewall module processes traffic sent to and from the port:
    saving a runtime state of the first version of the firewall module that relates to the port;
    transferring association of a firewall filter associated with the port from the first version of the firewall module to the second version of the firewall module;
    restoring the saved runtime state for the port to the second version of the firewall module;
    blocking the port before saving the runtime state of the first version of the firewall module; and
    unblocking the port after the runtime state has been restored to the second version of the firewall module.

2. The method of claim 1, wherein the first version of the firewall module is an existing version of the firewall module and the second version of the firewall module is an upgraded version of the firewall module.

3. The method of claim 1 further comprising unloading the first version of the firewall module from the host computer after the saved runtime state has been restored to the second version of the firewall module for each port of the plurality of ports.

4. The method of claim 1, wherein a plurality of non-firewall SDN (software defined network) modules executing on the host computer are upgraded before the firewall module is upgraded.

5. The method of claim 4, wherein a runtime migrator module is responsible for upgrading the plurality of SDN modules and the firewall module, wherein the runtime migrator module is loaded onto the host computer before upgrading the plurality of SDN modules and the firewall module, and unloaded after the plurality of SDN modules and the firewall module are upgraded.

6. The method of claim 1, wherein the first version of the firewall module is identified by a first number and the second version of the firewall module is identified by a different second number.

7. The method of claim 6, wherein the first number is associated with a first namespace defined for the firewall module and the different second number is associated with a second namespace defined for the firewall module.

8. The method of claim 1, wherein after a first port of the plurality of ports is upgraded, and before a last port of the plurality of ports is upgraded, at least one port of the plurality of ports is being serviced by the first version of the firewall module while at least another port of the plurality of ports is being serviced by the second version of the firewall module.

9. The method of claim 1, wherein each particular firewall filter is a distributed virtual (DV) firewall filter that performs filtering, encapsulation, and decapsulation of packets sent to and from the port associated with the particular DV firewall filter.

10. A non-transitory machine readable medium storing a program which when executed by at least one processing unit upgrades a firewall module executing on a host computer to process traffic sent to and from a plurality of machines executing on the host computer, the program comprising sets of instructions for:
    while a first version of a firewall module is executing on the host computer to process the traffic to and from the plurality of machines, loading a second version of the firewall module alongside the first version of the firewall module; and
    for each port of a plurality of ports associated with machines executing on the host computer for which the firewall module processes traffic sent to and from the port:
    saving a runtime state of the first version of the firewall module that relates to the port;
    transferring association of a firewall filter associated with the port from the first version of the firewall module to the second version of the firewall module;
    restoring the saved runtime state for the port to the second version of the firewall module;
    blocking the port before saving the runtime state of the first version of the firewall module; and
    unblocking the port after the runtime state has been restored to the second version of the firewall module.

11. The non-transitory machine readable medium of claim 10, wherein the first version of the firewall module is an existing version of the firewall module and the second version of the firewall module is an upgraded version of the firewall module.

12. The non-transitory machine readable medium of claim 10, wherein the program further comprises a set of instructions for unloading the first version of the firewall module from the host computer after the saved runtime state has been restored to the second version of the firewall module for each port of the plurality of ports.

13. The non-transitory machine readable medium of claim 10, wherein a plurality of non-firewall SDN (software defined network) modules executing on the host computer are upgraded before the firewall module is upgraded.

14. The non-transitory machine readable medium of claim 13, wherein the program is a runtime migrator module that is (i) loaded onto the host computer before upgrading the plurality of SDN modules and the firewall module and (ii) unloaded after the plurality of SDN modules and the firewall module are upgraded.

15. The non-transitory machine readable medium of claim 10, wherein the first version of the firewall module is identified by a first number and the second version of the firewall module is identified by a different second number.

16. The non-transitory machine readable medium of claim 15, wherein the first number is associated with a first namespace defined for the firewall module and the different second number is associated with a second namespace defined for the firewall module.

17. The non-transitory machine readable medium of claim 10, wherein after a first port of the plurality of ports is upgraded, and before a last port of the plurality of ports is upgraded, at least one port of the plurality of ports is being serviced by the first version of the firewall module while at least another port of the plurality of ports is being serviced by the second version of the firewall module.

18. The non-transitory machine readable medium of claim 10, wherein each particular firewall filter is a distributed virtual (DV) firewall filter that performs filtering, encapsulation, and decapsulation of packets sent to and from the port associated with the particular DV firewall filter.

\* \* \* \* \*